United States Patent
Tsuchihashi

(10) Patent No.: US 12,206,308 B2
(45) Date of Patent: Jan. 21, 2025

(54) ACTUATOR

(71) Applicant: NIDEC SANKYO CORPORATION, Nagano (JP)

(72) Inventor: Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 288 days.

(21) Appl. No.: 17/974,542

(22) Filed: Oct. 27, 2022

(65) Prior Publication Data

US 2023/0140711 A1 May 4, 2023

(30) Foreign Application Priority Data

Oct. 28, 2021 (JP) .................. 2021-176108

(51) Int. Cl.
| | |
|---|---|
| *H02K 33/16* | (2006.01) |
| *H02K 33/02* | (2006.01) |
| *H02K 33/04* | (2006.01) |
| *H02K 33/18* | (2006.01) |

(52) U.S. Cl.
CPC .................... *H02K 33/16* (2013.01)

(58) Field of Classification Search
CPC ........ H02K 33/04; H02K 33/18; H02K 33/02; H02K 33/16
USPC .............................. 310/15, 36, 81
See application file for complete search history.

(56) References Cited

U.S. PATENT DOCUMENTS

2020/0204054 A1\* 6/2020 Mori .................. H02K 33/02

FOREIGN PATENT DOCUMENTS

| JP | 2020102901 | | 7/2020 | |
|---|---|---|---|---|
| JP | 2020141484 | A * | 9/2020 | |
| JP | 2020162393 | A * | 10/2020 | ........... H02K 33/18 |
| WO | WO-2020022029 | A1 * | 1/2020 | |

\* cited by examiner

*Primary Examiner* — Jose A Gonzalez Quinones
(74) *Attorney, Agent, or Firm* — JCIPRNET

(57) ABSTRACT

A movable body of an actuator includes a first yoke to which a first magnet facing a coil from a Z1 direction is fixed, and a second yoke to which a second magnet facing the coil from a Z2 direction is fixed. The portion of the first yoke to which the first magnet is fixed consists of two members: a first inner member and a first outer member. The portion of the second yoke to which the second magnet is fixed consists of two members: a second inner member and a second outer member. The portions surrounding both sides of the coil in the X direction bond first connecting plate portions of the first outer member and second connecting plate portions of the second outer member.

7 Claims, 6 Drawing Sheets

ACTUATOR

CROSS REFERENCE TO RELATED APPLICATION

The present invention claims priority under 35 U.S.C. § 119 to Japanese Application No. 2021-176108 filed Oct. 28, 2021, the entire content of which is incorporated herein by reference.

BACKGROUND

Field of the Invention

At least an embodiment of the present invention relates to an actuator that vibrates a movable body.

Description of the Background Art

Japanese Patent Laid-Open No. 2020-102901 (JPA 2020-102901) discloses an actuator that has a movable body including magnets and a support body including coils, and that vibrates the movable body with respect to the support body by applying a drive current to the coil. Such a type of actuator uses an elastic or viscoelastic body as a connecting body that connects the support body and the movable body. When the movable body vibrates, a reaction force corresponding to the vibration of the movable body is applied to the support body through the connecting body. As a result, a user who is touching the support body can feel the vibration.

In the actuator of JPA 2020-102901, the support body has a coil holder. The coil is an air core coil and is disposed in a coil placement hole in the coil holder. The movable body includes a first yoke facing the coil from one side and a second yoke facing the coil from the other side, and magnets are fixed to the first and second yokes. The first yoke includes two connecting portions that bend and extend from the two ends of the first yoke toward the second yoke, and the connecting sections of the first yoke are welded or otherwise joined to the two ends of the second yoke. Such a structure constitutes a magnetic circuit through which the magnetic fluxes of the two magnets facing the coil from the two sides pass.

When an actuator is used as a tactile device that causes a user who touches the support body to sense vibration, the acceleration of the vibration of the movable body should be increased in order to cause the user to sense strong vibration. For example, it has been proposed to increase the acceleration of vibration of a movable body by increasing the weight of the movable body. In the configuration of JPA 2020-102901, the weight of the movable body can be readily increased by increasing the thickness of the first yoke and the second yoke.

However, to increase the thickness of the yokes, it is necessary to use magnetic plates of a different thickness than that of the general-purpose product, which increases the cost. In addition, simply increasing the thickness of the plates will increase the size of the movable body, which is detrimental to the miniaturization of the actuator. That is, in the yokes of JPA 2020-102901, not only does the height of the movable body (the dimension in the direction in which the magnets and coils face each other) increases due to the increased thickness of the flat plate portions to which the magnets are fixed, but the width of the movable body (the dimension in the direction of the vibration of the movable body) becomes larger due to the increased thickness of the connecting portions at the edges of the flat plate portions.

If the gap between the flat plate portion of the first yoke and the flat plate portion of the second yoke is reduced to suppress the increase in the height of the movable body due to the increased thickness of the flat plate portions, the space for the connecting body to be joined to the flat plate portion of the first yoke and the flat plate portion of the second yoke becomes narrower. Thus, the thickness of the connecting body must be reduced, which affects vibration characteristics. If the gap between the connecting portions is made narrower to reduce the increase in the width of the movable body due to the increased thickness of the connecting portions, the space for the movable body to vibrate cannot be secured.

At least an embodiment of the present invention increases the weight of the movable body and suppresses the influence on vibration characteristics and the enlargement of the movable body.

SUMMARY

An actuator according to at least an embodiment of the present invention includes: a movable body; a support body including a case that accommodates the movable body; a connecting body connected to the movable body and the support body; and a magnetic drive circuit including a coil and a magnet facing the coil in a first direction, the magnetic drive circuit causing the movable body to vibrate relative to the support body in a second direction intersecting the first direction. The movable body includes: a first yoke including a first inner member and a first outer member, the first inner member being stacked on the coil from a first side in the first direction, the first outer member being stacked on the first inner member from the first side in the first direction; and a second yoke including a second inner member and a second outer member, the second inner member being stacked on the coil from a second side in the first direction, the second outer member being stacked on the second inner member from the second side in the first direction. The magnets are fixed to at least one of the first inner member and the second inner member. The first outer member includes: a first flat plate portion to which the first inner member is fixed; and two first connecting plate portions extending from both ends of the first flat plate portion to the second side in the first direction. The second outer member includes: a second flat plate portion to which the second inner member is fixed; and two second connecting plate portions extending from both ends of the second flat plate portion to the first side in the first direction. The two first connecting plate portions are bonded to the two second connecting plate portions.

According to at least an embodiment of the present invention, the first yoke and the second yoke each includes two members (an inner member and an outer member) that are stacked on each other in the first direction. The outer members (the first outer member, the second outer member) of the first yoke and the second yoke each include connecting plate portions (the first connecting plate portions, the second connecting plate portions) extending in the first direction. When the first yoke and the second yoke are assembled, the connecting plate portions are bonded for assembly. With such a configuration, since the thickness of the portion opposing the coil in the first direction is increased as a result of the stacking of the two members, the weight of the yoke can be increased. The connecting plate portions disposed on both sides of the coil in the direction intersecting the first direction have the same plate thickness as when each yoke consist of one member. This can avoid an increase in the width of the movable body. Since narrowing of the gap between the connecting plate portions can be avoided, narrowing of the space for the movable body to vibrate can be avoided. Thus, the weight of the movable body can be increased, and the influence on the vibration characteristics and the enlargement of the movable body can be suppressed.

Since the weight of the yoke can be increased by using members having a plate thickness of a general-purpose product, a cost increase can be avoided.

In at least an embodiment of the present invention, a third direction intersects the first direction and the second direction; the two first connecting plate portions are disposed at both ends of the first flat plate portion in the second direction; the two second connecting plate portions are disposed at both ends of the second flat plate portion in the second direction; at least one of the first inner member and the second inner member includes a flat magnet fixing portion to which the magnet is fixed; at least one of the first flat plate portion and the second flat plate portion includes two connecting body fixing portions extending to both sides of the magnet fixing portion in the third direction, and the magnet fixing portion is fixed to a surface of the at least one of the first flat plate portion and the second flat plate portion facing the coil; and the connecting body is bonded to each of the two connecting body fixing portions. As described above, in at least one of the first yoke and the second yoke, portions (the connecting body fixing portions) to which the connecting bodies are bonded include only outer members, and thus, the thickness is not increased. Thus, it is possible to avoid a decrease in the placement space of the connecting bodies by increasing the weight of the movable body. Therefore, the influence on the vibration characteristics can be suppressed.

In at least an embodiment of the present invention, at least one of the first inner member and the second inner member has two cut-away portions formed by cutting away both ends of the magnet fixing portion in the third direction, and the connecting bodies are disposed in the two cut-away portions. Thus, by cutting away only the areas where the connecting bodies are disposed, the enlargement of the movable body can be suppressed and the weight of the movable body can be increased without narrowing the placement space of the connecting bodies. The edges of the cut-away portions also serve as guides for positioning the connecting bodies. Thus, the positional accuracy of the connecting bodies can be improved.

In at least an embodiment of the present invention, the first inner member and the second inner member each include the magnet fixing portion; the magnet includes a first magnet fixed to the magnet fixing portion of the first inner member and a second magnet fixed to the magnet fixing portion of the second inner member; and the connecting bodies include two first connecting bodies bonded to the two connecting body fixing portions disposed on the first flat plate portion at both ends of the first magnet in the third direction, and two second connecting bodies bonded to the two connecting body fixing portions disposed on the second flat plate portion at both ends of the second magnet in the third direction. Thus, by disposing magnets on both sides of the coil in the first direction, the weight of the movable body can be increased and the driving force of the magnetic drive mechanism can be increased. Since the first yoke and the second yoke are each connected to the support body via a connecting body, the movement of the movable body can be suppressed in a direction different from the vibration direction. In both the first yoke and the second yoke, portions (the connecting body fixing portions) to which the connecting bodies are bonded include only outer members, and thus, the thickness is not increased. Thus, it is possible to avoid a decrease in the placement space of the connecting bodies by increasing the weight of the movable body, and the influence on the vibration characteristics can be suppressed.

In at least an embodiment of the present invention, the support body includes a metallic first plate stacked on the coil from the first side in the first direction; and a metallic second plate stacked on the coil from the second side in the first direction; the coil is fixed to the case via the first plate and the second plate; the first connecting bodies connect the connecting body fixing portions disposed on the first flat plate portion to the first plat; and the second connecting bodies connect the connecting body fixing portions disposed on the second flat plate portion and the second plate. In this way, the two sides in the first direction of the coil are covered with metal plates, and the metal plates and the yokes are connected by the connecting bodies on the inner side of the yokes. Since it is not necessary to secure a space for placing the connecting bodies in the gaps between the case and the yokes, the dimension of the actuator in the first direction can be reduced.

In at least an embodiment of the present invention, at least one of the first inner member and the second inner member includes two raised portions extending from edges of both sides of the magnet fixing portion in the second direction to a side on which the coil is disposed. In this way, the weight of the movable body is increased by the raised portions. Thus, the weight of the movable body can be increased.

In at least an embodiment of the present invention, one of the two first connecting plate portions and the two second connecting plate portions are press-fitted to an inner side of the other one of the two first connecting plate portions and the two second connecting plate portions.

In this way, since the length of the first connecting plate portions and the second connecting plate portions in the first direction can be increased, the weight of the movable body can be increased. Since the first yoke and the second yoke can be easily assembled, and the formation of gaps between the first connecting plate portions and the second connecting plate portions can be avoided, the generation of chattering noise during vibration can be prevented or suppressed.

In at least an embodiment of the present invention, since the thickness of the portions of the yokes of the movable body opposing the coil in the first direction is increased as a result of the stacking of the two members, the weight of the yokes can be increased. The connecting plate portions disposed on both sides of the coil in the direction intersecting the first direction have the same plate thickness as when each yoke consist of one member. This can avoid an increase in the width of the movable body. Since narrowing of the gap between the connecting plate portions can be avoided, narrowing of the space for the movable body to vibrate can be avoided. Thus, the weight of the movable body can be increased, and the influence on the vibration characteristics and the enlargement of the movable body can be suppressed. Since the weight of the yoke can be increased by using members having a plate thickness of a general-purpose product, a cost increase can be avoided.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An actuator according to at least an embodiment of the present invention will now be described with reference to the drawings.

Overall Configuration

Figure 1A:
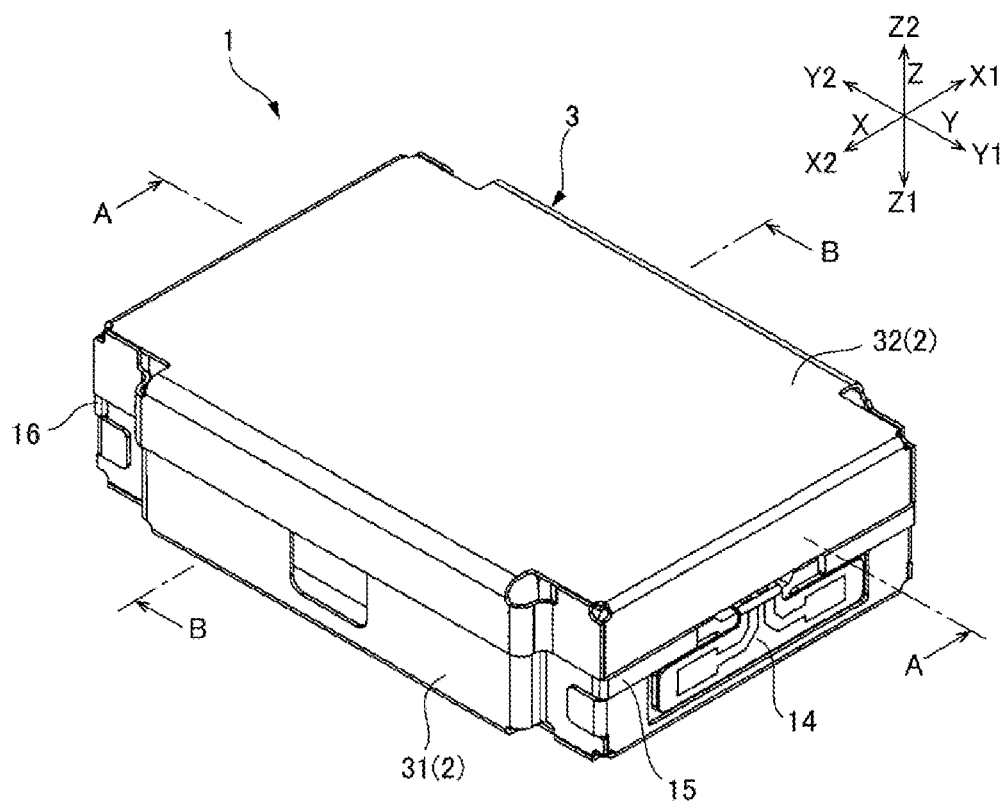
FIGS. 1A and 1B are perspective views of an actuator to which at least an embodiment of the present invention is applied when viewed from a Z2 direction and a Z1 direction.

FIG. 1A is a perspective view of an actuator 1 according to at least an embodiment of the present invention viewed from a Z2 direction.

Figure 1B:
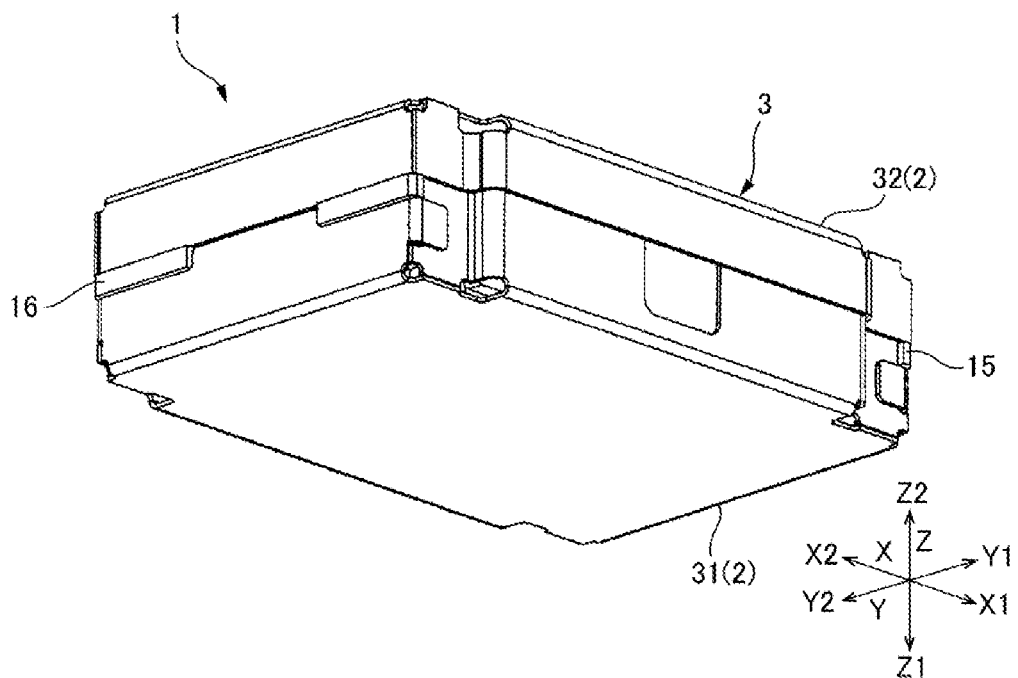
Figure 2:
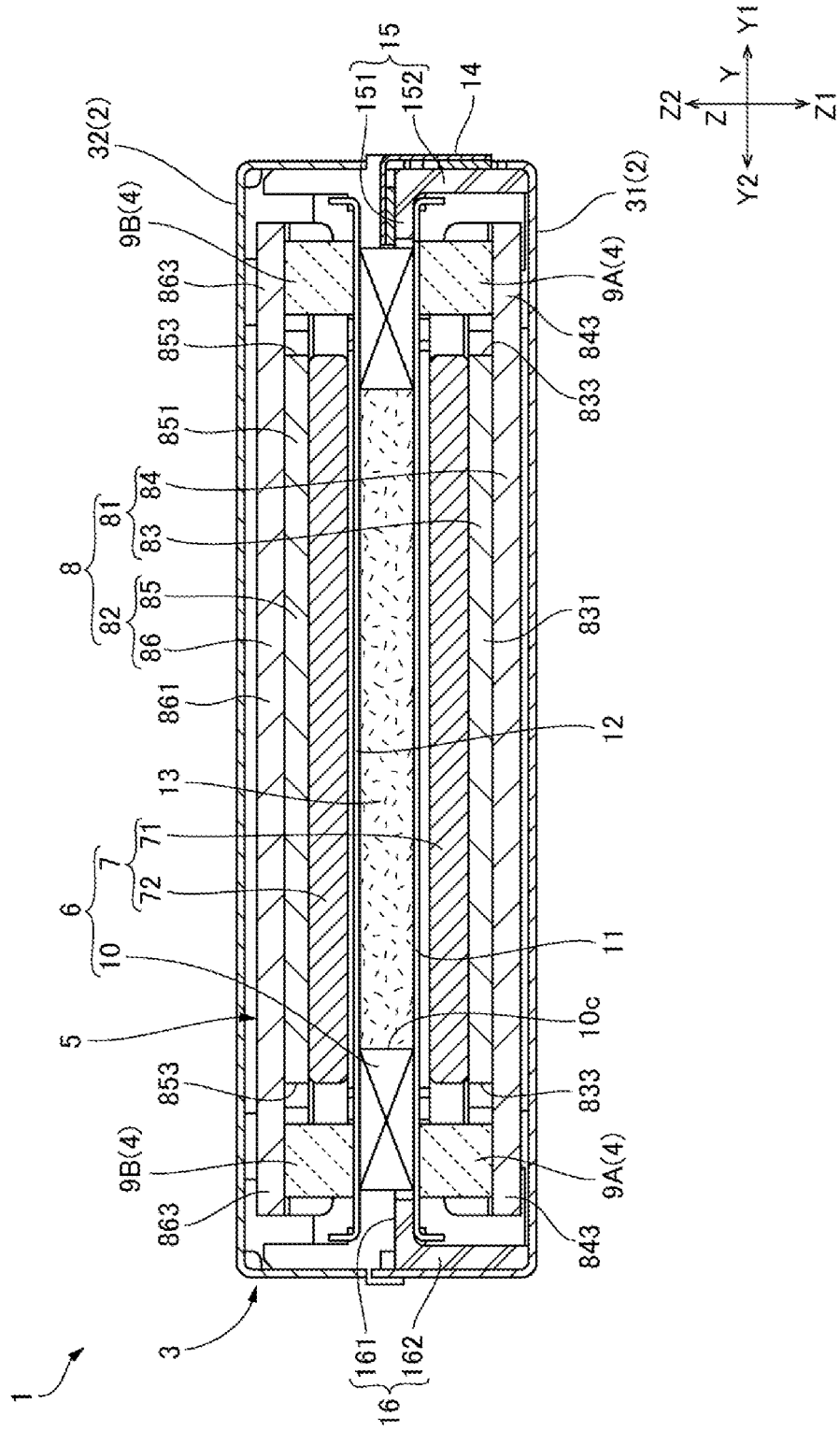
FIG. 2 is a cross-sectional view of the actuator taken along the longitudinal direction or line A-A in FIG. 1.
Figure 3:
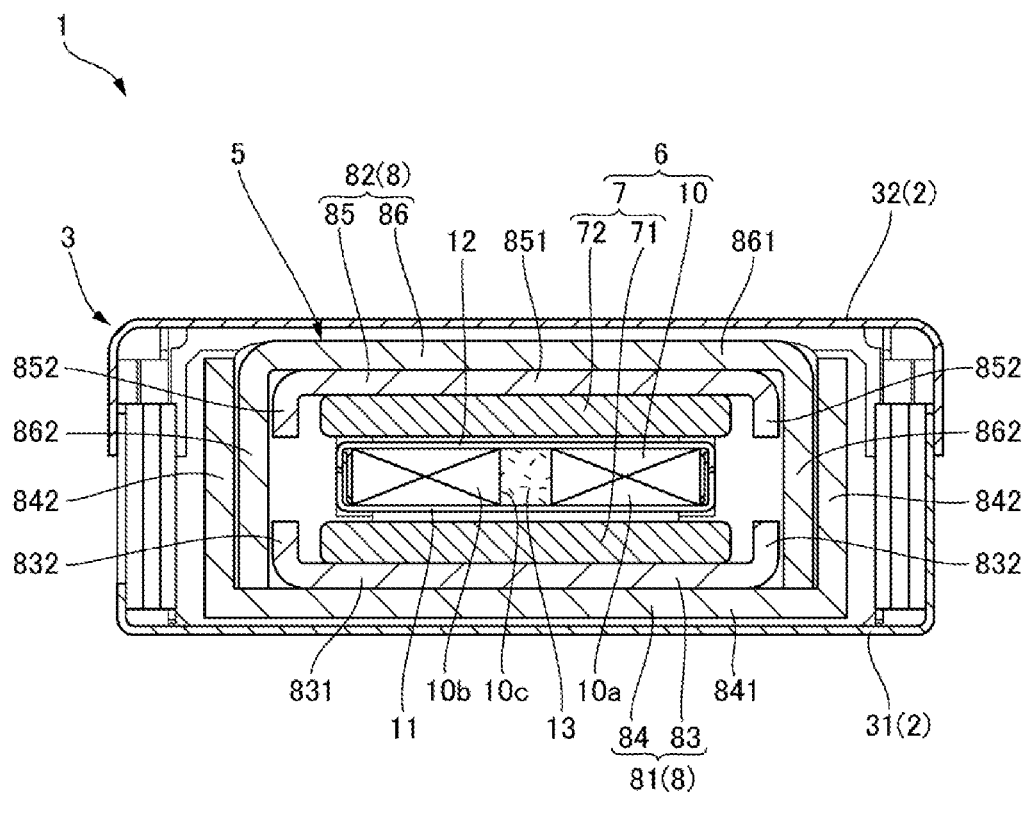
FIG. 3 is a cross-sectional view of the actuator taken along a direction orthogonal to the longitudinal direction or line B-B in FIG. 1.

FIG. 1B is a perspective view of an actuator 1 according to at least an embodiment of the present invention viewed from a Z1 direction. FIG. 2 is a cross-sectional view of the actuator 1 taken along the longitudinal direction or line A-A in FIG. 1A. FIG. 3 is a cross-sectional view of the actuator 1 taken along a direction orthogonal to the longitudinal direction or line B-B in FIG. 1A.

The actuator 1 is used as a tactile device that transmits information through vibration. As illustrated in FIGS. 1A and 1B, the external shape of the actuator 1 is rectangular. The actuator 1 generates vibration in a transverse direction of its external shape. In the following description, the transverse direction in which vibration occurs is the X direction (second direction); the longitudinal direction of the actuator 1 that is orthogonal to the X direction is the Y direction (third direction); and the direction of the thickness of the actuator 1 (height direction), which is orthogonal to the X and Y directions, is the Z direction (first direction). One side of the X direction is an X1 direction and the other side is an X2 direction. One side of the Y direction is a Y1 direction and the other side is a Y2 direction. One side of the Z direction is a Z1 direction and the other side is a Z2 direction.

As illustrated in FIGS. 1A, 1B, 2, and 3, the actuator 1 includes a support body 3 including a case 2 that defines the external shape, and a movable body 5 that is accommodated inside the case 2. The actuator 1 further includes connecting bodies 4 that connects the support body 3 and the movable body 5, and a magnetic drive circuit 6 that moves the movable body 5 in the X direction relative to the support body 3 (see FIGS. 2 and 3).

Support Body

As illustrated in FIGS. 2 and 3, the support body 3 includes a coil 10, a first plate 11 stacked in the Z1 direction of the coil 10, and a second plate 12 stacked in the Z2 direction of the coil 10. The coil 10 is positioned in the center of the case 2 in the Z direction. The coil 10 is a flat air core coil having its thickness direction oriented in the Z direction. The coil 10 has an oval shape long in the Y direction, and has two long sides 10a and 10b (see FIG. 3) that extend parallel to each other in the Y direction. A central hole 10c extending in the Y direction is disposed between the two long sides.

As illustrated in FIG. 2, the support body 3 includes a first holder member 15 disposed on the Y1 side of the coil 10 and a second holder member 16 disposed on the Y12 side of the coil 10. The first holder member 15 and the second holder member 16 are composed of resin. The first holder member 15 has a first coil holding portion 151 disposed between the first plate 11 and the second plate 12, and a first side plate portion 152 extending from the Y1 side end of the first coil holding portion 151, from the Z1 direction to the Z2 direction. The second holder member 16 has a second coil holding portion 161 disposed between the first plate 11 and the second plate 12, and a second side plate portion 162 extending from the Y1 side end of the second coil holding portion 161, from the Z1 direction to the Z2 direction. The coil 10 is disposed between the first coil holding portion 151 and the second coil holding portion 161.

The first plate 11 and the second plate 12 are composed of a non-magnetic material. As illustrated in FIG. 3, the two ends of the first plate 11 and the second plate 12 are bent in the X direction at a substantially right angle and cover the outer circumferential surface of the coil 10 in the X direction. The first plate 11 is stacked on the Z1 side of the first coil holding portion 151 and the second coil holding portion 161, and is fixed to the first coil holding portion 151 and the second coil holding portion 161. The second plate 12 is stacked on the Z2 side of the first coil holding portion 151 and the second coil holding portion 161, and is fixed to the first coil holding portion 151 and the second coil holding portion 161.

A power feed substrate 14 is fixed to the Y1 direction end of the first holder member 15. In the present embodiment, the power feed substrate 14 is a flexible printed circuit board. The power feed substrate 14 may be a rigid substrate. The coil 10 includes two coil wires led out in the Y1 direction, and the coil wires are connected to a wiring pattern on the surface of the power feed substrate 14. Power is supplied to the coil 10 via the power feed substrate 14.

When the support body 3 is assembled, the second plate 12 is fixed to the first holder member 15 and the second holder member 16 from the Z1 side, the coil is disposed between the first coil holding portion 151 and the second coil holding portion 161, and the power feed substrate 14 is fixed to the first holder member 15. Subsequently, the central hole 10c of the coil 10 is filled with an adhesive agent, and the first plate 11 is assembled from the Z2 side. This completes the assembly of an assembled body including the coil 10, the first plate 11, the second plate 12, the power feed substrate 14, the first holder member 15, and the second holder member 16. As illustrated in FIGS. 2 and 3, an adhesive layer 13 composed of the cured adhesive agent is formed in the central hole 10c of the coil 10.

As illustrated in FIGS. 1A, 1B, 2, and 3, the case 2 includes a first case member 31 and a second case member 32 stacked in the Z direction. The first case member 31 is assembled to the first holder member 15 and the second holder member 16 from the Z1 direction. The second case member 32 is assembled to the first holder member 15 and the second holder member 16 from the Z2 direction. As illustrated in FIG. 1A, the power feed substrate 14 is led out through a cut-away portion in the center in the X direction of the first holder member 15 to the Y1 direction side of the case 2 and bent in the Z1 direction.

Movable Body

The movable body 5 includes magnets 7 and yokes 8. As illustrated in FIGS. 2 and 3, the magnets 7 oppose the coil 10 in the Z direction. The coil 10 and the magnets 7 constitute the magnetic drive circuit 6. The movable body 5 includes a first magnet 71 and a second magnet 72 as the magnets 7. The first magnet 71 is positioned in the Z1 direction of the coil 10. The second magnet 72 is positioned in the Z2 direction of the coil 10.
The first magnet 71 and the second magnet 72 are polarized into two in the X direction. As illustrated in FIG. 3, when the movable body 5 and the support body 3 are assembled, the long sides 10a and 10b of the coil 10 oppose the first magnet 71 in the Z1 direction and the second magnet 72 in the Z2 direction.

Figure 4:
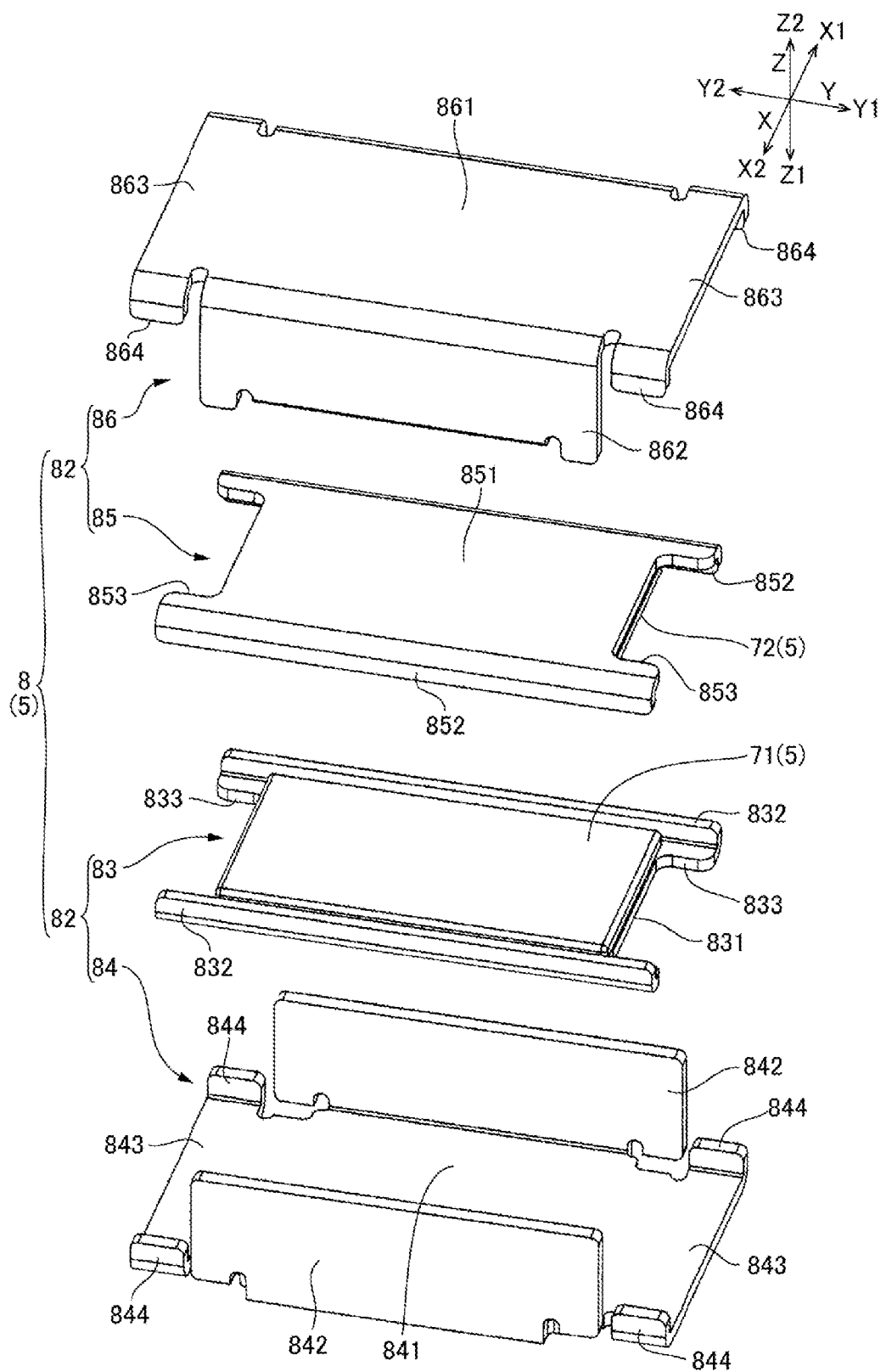
FIG. 4 is an exploded perspective view of a movable body viewed from the Z2 direction.
Figure 5:
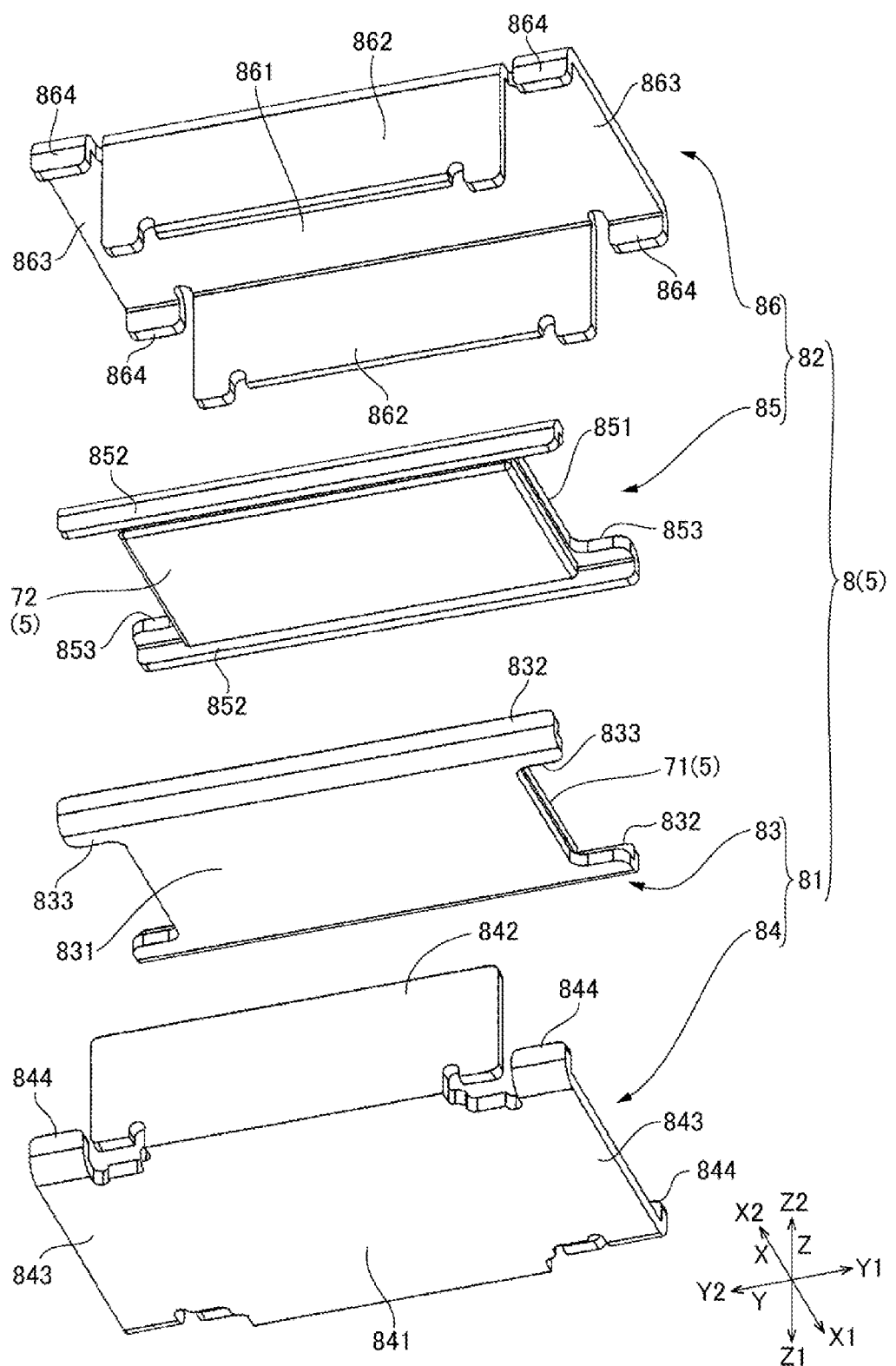
FIG. 5 is an exploded perspective view of a movable body viewed from the Z1 direction.
Figure 6:
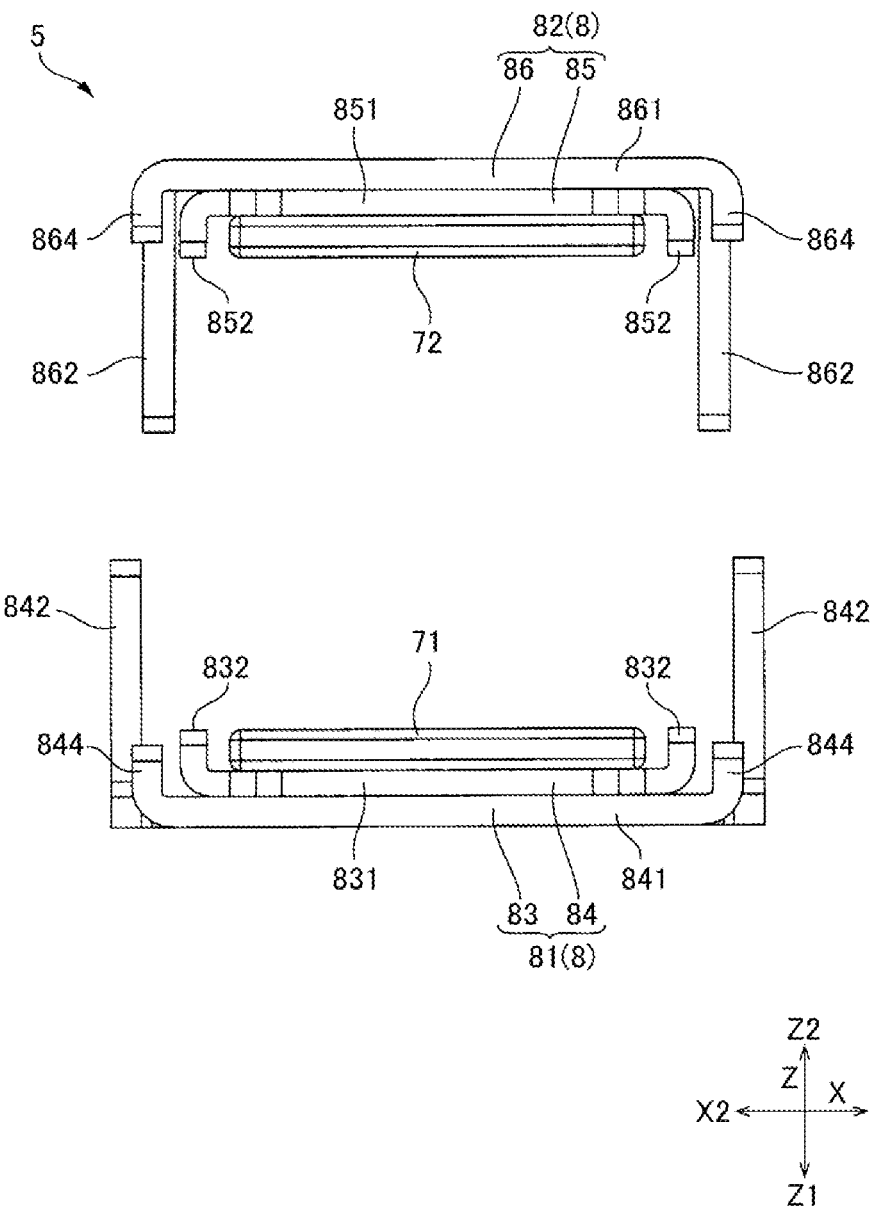
FIG. 6 is a side view of a first yoke and a second yoke disassembled.

FIG. 4 is an exploded perspective view of the movable body 5 viewed from the Z2 direction. FIG. 5 is an exploded perspective view of the movable body 5 viewed from the Z1 direction. FIG. 6 is a side view of a first yoke 81 and a second yoke 82 in a disassembled state. In the present embodiment, the yokes 8 are composed of a magnetic material. As illustrated in FIGS. 2 to 6, the yokes 8 consist of the first yoke 81 and the second yoke 82. The first yoke 81 includes a first inner member 83 stacked on the coil 10 in the Z1 direction and a first outer member 84 stacked on the first inner member 83 in the Z1 direction. The second yoke 82 includes a second inner member 85 stacked on the coil 10 in the Z1 direction and a second outer member 86 stacked on the second inner member 85 in the Z1 direction.

As illustrated in FIGS. 4 and 5, the first outer member 84 includes a first flat plate portion 841 long in the Y direction and two first connecting plate portions 842 extending in the Z2 direction from the central portion in the Y direction of the two ends of the first flat plate portion 841 in the X direction. The two ends of the first flat plate portion 841 in the Y direction are provided with two connecting body fixing portions 843 disposed at the two ends of the first connecting plate portions 842 in the Y direction. The ends of the two sides in the X direction of each of the connecting body fixing portions 843 are provided with raised portions 844 bent in the Z2 direction.
As illustrated in FIG. 2, each of the connecting body fixing portions 843 is connected to the first plate 11 through a first connecting body 9A.

The first inner member 83 includes a magnet fixing portion 831 long in the Y direction and two raised portions 832 bent in the Z2 direction from the two ends of the magnet fixing portion 831 in the X direction. The magnet fixing portion 831 is fixed to the Z1 side of the first flat plate portion 841. As illustrated in FIG. 3, the two raised portions 832 are disposed on the inner sides of the two first connecting plate portions 842 and surround the two X direction sides of the first magnet 71 fixed to the magnet fixing portion 831.

As illustrated in FIGS. 4 and 5, the first inner member 83 has two cut-away portions 833 formed by cutting away the center in the Y direction of the two ends of the magnet fixing portion 831 in the Y direction. Each of the cut-away portions 833 has a rectangular shape long in the X direction, and is disposed in the center of the magnet fixing portion 831 in the Y direction. As illustrated in FIG. 2, the first connecting body 9A disposed on the Y1 side of the first magnet 71 and the first connecting body 9A disposed on the Y2 side of the first magnet 71 are placed in cut-away portions 833.

As illustrated in FIGS. 4 and 5, the second outer member 86 includes a second flat plate portion 861 long in the Y direction and two second connecting plate portions 862 extending in the Z1 direction from the central portion in the Y direction of the two ends of the second flat plate portion 861 in the X direction. The two ends of the second flat plate portion 861 in the Y direction are provided with two connecting body fixing portions 863 disposed at the two ends of the second connecting plate portions 862. The ends of the two sides in the X direction of each of the connecting body fixing portions 863 are provided with raised portions 864 bent in the Z1 direction. As illustrated in FIG. 2, each of the connecting body fixing portions 863 is connected to the second plate 12 through a second connecting body 9B.

The second inner member 85 includes a magnet fixing portion 851 long in the Y direction and two raised portions 852 bent in the Z2 direction from the two ends of the magnet fixing portion 851 in the X direction. The magnet fixing portion 851 is fixed to the Z2 side of the second flat plate portion 861. As illustrated in FIG. 3, the two raised portions 852 are disposed on the inner sides of the two second connecting plate portions 862 and surround the two X direction sides of the second magnet 72 fixed to the magnet fixing portion 851.

As illustrated in FIGS. 4 and 5, the second inner member 85 has two cut-away portions 853 formed by cutting away the center in the Y direction of the two ends of the magnet fixing portion 851 in the Y direction. Each of the cut-away portions 853 has a rectangular shape long in the X direction, and is disposed in the center of the magnet fixing portion 851 in the Y direction. As illustrated in FIG. 2, the second connecting body 9B disposed on the Y1 side of the second magnet 72 and the second connecting body 9B disposed on the Y2 side of the second magnet 72 are placed in cut-away portions 853.

The first yoke 81 is assembled by welding together the first inner member 83 and the first outer member 84. The second yoke 82 is assembled by welding together the second inner member 85 and the second outer member 86. The yokes 8 are assembled in a shape surrounding the outer circumferential sides of the coil 10, the first plate 11, and the second plate 12 by press-fitting and fixing two second connecting plate portions 862 of the second yoke 82 to the inner sides of the two first connecting plate portions 842 of the first yoke 81.

Connecting Body

As illustrated in FIG. 2, the connecting bodies 4 consist of the first connecting bodies 9A and the second connecting bodies 9B. The first connecting bodies 9A and the second connecting bodies 9B each have a rectangular shape long in the X direction. The first connecting bodies 9A are positioned in the Z1 direction of the coil 10. The second connecting bodies 9B are positioned in the Z2 direction of the coil 10. The first connecting bodies 9A are disposed at two locations on the Y1 side and the Y2 side of the first magnet 71, and are each composed of two members of the same shape. The second connecting bodies 9B are disposed at two locations on the Y1 side and the Y2 side of the second magnet 72, and are each composed of two members of the same shape. The first connecting bodies 9A and the second connecting bodies 9B have at least one of elasticity and viscoelasticity.

The first connecting bodies 9A are disposed between the first yoke 81 and the first plate 11. The first connecting bodies 9A are disposed in the two cut-away portions 833 provided at the end portion in the Y1 direction of the first yoke 81 and the end portion in the Y2 direction of the first yoke 81. The first connecting bodies 9A on the Y1 side are disposed between the connecting body fixing portions 843 provided at the end in the Y1 direction of the first outer member 84 and the end portion in the Y1 direction of the first plate 11. The first connecting bodies 9A on the Y2 side are disposed at two locations between the connecting body fixing portions 843 provided at the end in the Y2 direction of the first outer member 84 and the end portion in the Y2 direction of the first plate 11. The first connecting bodies 9A are compressed in the Z direction between the connecting body fixing portions 843 and the first plate 11.

The second connecting bodies 9B are disposed between the second yoke 82 and the second plate 12. The second connecting bodies 9B are disposed in the two cut-away portions 853 provided at the end portion in the Y1 direction of the second yoke 82 and the end portion in the Y2 direction of the second yoke 82. The second connecting bodies 9B on the Y1 side are disposed between the connecting body fixing portions 863 provided at the end in the Y1 direction of the second outer member 86 and the end portion in the Y1 direction of the second plate 12. The second connecting bodies 9B on the Y2 side are disposed at two locations between the connecting body fixing portions 863 provided at the end in the Y2 direction of the second outer member 86 and the end portion in the Y2 direction of the second plate 12. The second connecting bodies 9B are compressed in the Z direction between the connecting body fixing portions 863 and the second plate 12.

In the present embodiment, the first connecting bodies 9A and the second connecting bodies 9B are gel-like members composed of silicone gel. Silicone gel is a viscoelastic body whose spring constant when it deforms in an expanding/contracting direction is approximately three times larger than the spring constant when it deforms in a shear direction. Deformation of the viscoelastic body in a direction (shear direction) that intersects a thickness direction is deformation in the direction in which the viscoelastic body is pulled and stretched. Thus, the viscoelastic body has deformation characteristics in which a linear component is larger than a nonlinear component. When the viscoelastic body deforms due to pressing and compressing in the thickness direction, the viscoelastic body has expanding/contracting characteristics in which the nonlinear component is larger than the linear component, whereas when the viscoelastic body is pulled and stretched in the thickness direction, the viscoelastic body has expanding/contracting characteristics in which the linear component is larger than the nonlinear component.

Alternatively, the first connecting bodies 9A and the second connecting bodies 9B may be composed of various rubber materials such as natural rubber, diene rubber (e.g., styrene butadiene rubber, isoprene rubber, butadiene rubber, chloroprene rubber, acrylonitrile butadiene rubber, etc.), non-diene rubber (e.g., butyl rubber, ethylene propylene rubber, ethylene propylene diene rubber, urethane rubber, silicone rubber, fluoro rubber, etc.), and thermoplastic elastomers, and their modified materials.

Operation of Actuator

When a current in a predetermined direction is supplied to the coil 10 via the power feed substrate 14, the movable body 5 supported by the support body 3 moves in one of the X directions relative to the support body 3 by the driving force of the magnetic drive circuit 6. Then, when the direction of the electric current is reversed, the movable body 5 moves in the other of the X directions relative to the support body 3. The repeated reversal of the direction of the current supplied to the coil 10 vibrates the movable body 5. When the movable body 5 vibrates in the X direction, the first connecting bodies 9A and the second connecting bodies 9B deform in the shear direction.

Main Advantageous Effects of Present Embodiment

As described above, the actuator 1 according to the present embodiment includes a movable body 5, a support body 3 including a case 2 that accommodates the movable body 5, a connecting body 4 connected to the movable body 5 and the support body 3, a magnetic drive circuit 6 including a coil 10 and magnets 7 (first magnet 71 and second magnet 72) facing the coil 10 in the Z direction and causing the movable body 5 to vibrate in the X direction intersecting the Z direction relative to the support body 3. The movable body 5 includes a first yoke 81 including a first inner member 83 stacked on the coil 10 from the Z1 direction and a first outer member 84 stacked on the first inner member 83 from the Z1 direction, and a second yoke 82 including a second inner member 85 stacked on the coil 10 from the Z2 direction and a second outer member 86 stacked on the second inner member 85 from the Z2 direction. The magnets 7 are first magnet 71 fixed to the magnet fixing portion 831 of the first inner member 83 and a second magnet 72 fixed to the magnet fixing portion 851 of the second inner member 85. The first outer member 84 includes a first flat plate portion 841 to which the first inner member 83 is fixed and two first connecting plate portions 842 extending in the Z2 direction from the two ends of the first flat plate portion 841. The second outer member 86 includes a second flat plate portion 861 to which the second inner member 85 is fixed and two second connecting plate portions 862 extending in the Z1 direction from the two ends of the second flat plate portion 861. The two second connecting plate portions 862 are bonded to the two first connecting plate portions 842.

According to the present embodiment, the first yoke 81 and the second yoke 82 each include two members (an inner member and an outer member) that are stacked on each other in the Z direction. The outer members (the first outer member 84, the second outer member 86) of the first yoke 81 and the second yoke 82 each include connecting plate portions (the first connecting plate portions 842, the second connecting plate portions 862) extending in the Z direction. When the first yoke 81 and the second yoke 82 are assembled, the connecting plate portions are bonded for assembly. Since the thickness of the portions of the yokes 8 opposing the coil 10 in the Z direction is increased as a result of the stacking of the two members, the weight of the movable body 5 is increased. The portions disposed on the two sides of the coil 10 in the direction intersecting the Z direction are composed only of the outer members, and the thickness is the same as each of the first yoke 81 and the second yoke 82 composed of one member. This can avoid an increase in the width of the movable body 5 in the X direction. Since the thickness of the connecting plate portions does not increase, narrowing of the gap between the connecting plate portions can be avoided. Thus, narrowing of the space for the movable body 5 to vibrate can be avoided. Thus, the weight of the movable body 5 can be increased, and the influence on the vibration characteristics and the enlargement of the movable body 5 can be suppressed. The weight of the yoke can be increased by using members having a plate thickness of a general-purpose product by stacking the two members to increase the weight. Thus, a cost increase can be avoided.

In the present embodiment, the two first connecting plate portions 842 are disposed at the two ends of the first flat plate portion 841 in the X direction, and the two second connecting plate portions 862 are disposed at the two ends of the second flat plate portion 861 in the X direction. The first inner member 83 includes flat magnet fixing portion 831 to which the first magnet 71 is fixed, and the second inner member 85 includes a flat magnet fixing portion 851 to which the second magnet 72 is fixed. The first flat plate portion 841 has a Z2 side surface (the surface opposing the coil 10) to which the magnet fixing portion 831 is fixed and has two connecting body fixing portions 843 that extend to the two ends of the magnet fixing portion 831 in the Y direction. The second flat plate portion 861 has a Z1 side surface (the surface opposing the coil 10) to which the magnet fixing portion 851 is fixed and has two connecting body fixing portions 863 that extend to the two ends of the magnet fixing portion 851 in the Y direction. The connecting bodies 4 consist of first connecting bodies 9A connected to the two connecting body fixing portions 843 and second connecting bodies 9B bonded to the two connecting body fixing portions 863. As described above in the present embodiment, in each of the first yoke 81 and the second yoke 82, portions (the connecting body fixing portions 843, 863) to which the connecting bodies 4 are bonded include only outer members, and the thickness is not increased. Thus, the placement space for the connecting bodies 4 is not narrowed by the increase in the weight of the movable body 5, and the thickness of the connecting bodies 4 in the Z direction need not be reduced. Therefore, the influence on the vibration characteristics can be suppressed.

In the present embodiment, the first inner member 83 has two cut-away portions 833 formed by cutting away the two ends of the magnet fixing portion 831 in the Y direction, and the first connecting bodies 9A are disposed in the two cut-away portions 833. The second inner member 85 has two cut-away portions 853 formed by cutting away the two ends of the magnet fixing portion 851 in the Y direction, and the second connecting bodies 9B are disposed in the two cut-away portions 853. In such a configuration, the first yoke 81 and the second yoke 82 are both designed so that their weight is increased without increasing the thickness of the portions where the connecting bodies 4 (the first connecting bodies 9A, the second connecting bodies 9B) are disposed. Therefore, the enlargement of the movable body 5 can be suppressed, and to the weight of the movable body 5 can be increased.

The present embodiment includes the first magnet 71 and the second magnet 72 as the magnets 7. Alternatively, the present embodiment may include one of the first magnet 71 and the second magnet 72. In such a case, only one of the first inner member 83 and the second inner member 85 may include a magnet fixing portion. It is possible to adopt a configuration in which only one of the first connecting bodies 9A and the second connecting bodies 9B are provided as the connecting bodies 4. In such a case, of the first inner member 83 and the second inner member 85, whichever is disposed on the same side as the connecting bodies 4 relative to the coil 10 can be provided with cut-away portions at the two ends in the Y direction. In the first inner member 83 and the second inner member 85, the cut-away portions may be provided only on one of the Y1 side end and the Y2 side end.

In the present embodiment, the support body 3 includes a first plate 11 that is composed of metal and stacked the coil 10 from the Z1 direction and a second plate 12 that is composed of metal and is stacked on the coil 10 from the Z2 direction. The coil 10 is fixed to a case 2 via the first plate 11 and the second plate 12; first connecting bodies 9A connect connecting body fixing portions 843 provided on a first flat plate portion 841 to the first plate 11; and the second connecting bodies 9B connect connecting body fixing portions 863 provided on a second flat plate portion 861 to the second plate 12. In this way, the two sides of the coil 10 in the Z direction are covered with metal plates, and the yokes 8 and the plates are connected inside the yokes 8 that surround the metal plates by the connecting bodies 4. Since it is not necessary to secure a space for placing the connecting bodies 4 in the gaps between the case 2 and the yokes 8, the dimension of the actuator in the Z direction can be reduced.

In the present embodiment, the first inner member 83 includes two raised portions 832 extending from the edges on the two sides of the magnet fixing portion 831 in the X direction to the side (Z2 side) on which the coil 10 is disposed. The second inner member 85 includes two raised portions 852 extending from the edges on the two sides of the magnet fixing portion 851 in the X direction to the side (Z1 side) on which the coil 10 is disposed. Thus, the weight of the yokes 8 is increased by the amount of the raised portions 832 and 852, so that the weight of the movable body 5 weight can be increased.

Alternatively, the raised portions may be provided with neither the first inner member 83 nor the second inner member 85. Alternatively, the raised portions may be with only one of the first inner member 83 and the second inner member 85.

In the present embodiment, the two second connecting plate portions 862 are disposed on the inner side of the two first connecting plate portions 842, and the first connecting plate portions 842 and the second connecting plate portions 862 are stacked on and bonded to each other. Since the length of the first connecting plate portions 842 and the second connecting plate portions 862 in the Z direction can be increased, the weight of the movable body 5 can be increased. This configuration facilitates the assembly of the first yoke 81 and the second yoke 82. Alternatively, a configuration may be adopted in which the two second connecting plate portions 862 are disposed on the outer side and the two first connecting plate portions 842 are disposed between the two second connecting plate portions 862.

In the present embodiment, the two second connecting plate portions 862 are press-fitted and fixed between the two first connecting plate portions 842 to assemble the first yoke 81 and the second yoke 82 into a single unit. For example, the two second connecting plate portions 862 are formed to have a shape that slightly tilts in the direction in which the distance in the X direction increases toward the Z1 side. Alternatively, the two second connecting plate portions 862 may each have a protrusion protruding from the surface facing outward in the X direction, or the two first connecting plate portions 842 may each have a protrusion protruding from the surface facing inward in the X direction. By adopting such a shape, the two second connecting plate portions 862 are press-fitted when they are inserted between the two first connecting plate portions 842. The press-fit state prevents gaps from being formed between the first connecting plate portions 842 and the second connecting plate portions 862. Thus, chattering noise can be prevented or suppressed when the movable body 5 vibrates.

Alternatively, a configuration may be adopted in which the two second connecting plate portions 862 are inserted, not press-fitted, between the two first connecting plate portions 842 and fixed by welding or an adhesive agent.

In the present embodiment, all the members constituting the yokes 8 are magnetic, but, alternatively, only the members in contact to the magnets 7 may be magnetic. For example, the first inner member 83 and the second inner member 85 may be magnetic bodies, and the first outer member 84 and the second outer member 86 may be composed of a material different from that of the first inner member 83 and the second inner member 85. For example, as the first outer member 84 and the second outer member 86, magnetic bodies or non-magnetic bodies having a higher specific gravity than that of the first inner member 83 and the second inner member 85 may be used to provide a function as weights. This can increase the weight of the movable body 5.

What is claimed is:

1. An actuator comprising:
  a movable body;
  a support body comprising a case that accommodates the movable body;
  a connecting body connected to the movable body and the support body; and
  a magnetic drive circuit comprising a coil and a magnet facing the coil in a first direction, the magnetic drive circuit causing the movable body to vibrate relative to the support body in a second direction intersecting the first direction, wherein,
  the movable body comprises:
    a first yoke comprising a first inner member and a first outer member, the first inner member being stacked on the coil from a first side in the first direction, the first outer member being stacked on the first inner member from the first side in the first direction; and
    a second yoke comprising a second inner member and a second outer member, the second inner member being stacked on the coil from a second side in the first direction, the second outer member being stacked on the second inner member from the second side in the first direction,
  the magnet is fixed to at least one of the first inner member and the second inner member,
  the first outer member comprises:
    a first flat plate portion to which the first inner member is fixed; and
    two first connecting plate portions extending from both ends of the first flat plate portion to the second side in the first direction,
  the second outer member comprises:
    a second flat plate portion to which the second inner member is fixed; and
    two second connecting plate portions extending from both ends of the second flat plate portion to the first side in the first direction, and
  the two first connecting plate portions are bonded to the two second connecting plate portions.

2. The actuator according to claim 1, wherein,
  a third direction intersects the first direction and the second direction,
  the two first connecting plate portions are disposed at both ends of the first flat plate portion in the second direction,
  the two second connecting plate portions are disposed at both ends of the second flat plate portion in the second direction,
  at least one of the first inner member and the second inner member comprises a flat magnet fixing portion to which the magnet is fixed,
  at least one of the first flat plate portion and the second flat plate portion comprises two connecting body fixing portions extending to both sides of the magnet fixing portion in the third direction, the magnet fixing portion being fixed to a surface of the at least one of the first flat plate portion and the second flat plate portion facing the coil, and
  the connecting body is bonded to each of the two connecting body fixing portions.

3. The actuator according to claim 2, wherein,
  at least one of the first inner member and the second inner member has two cut-away portions formed by cutting away both ends of the magnet fixing portion in the third direction, and
  the connecting bodies are disposed in the two cut-away portions.

4. The actuator according to claim 2, wherein,
  the first inner member and the second inner member each comprises the magnet fixing portion,
  the magnet comprises:
    a first magnet fixed to the magnet fixing portion of the first inner member; and
    a second magnet fixed to the magnet fixing portion of the second inner member, and
  the connecting bodies comprise:
    two first connecting bodies bonded to the two connecting body fixing portions disposed on the first flat plate portion at both ends of the first magnet in the third direction; and
    two second connecting bodies bonded to the two connecting body fixing portions disposed on the second flat plate portion at both ends of the second magnet in the third direction.

5. The actuator according to claim 4, wherein,
  the support body comprises:
    a metallic first plate stacked on the coil from the first side in the first direction; and
    a metallic second plate stacked on the coil from the second side in the first direction,
  the coil is fixed to the case via the first plate and the second plate,
  the first connecting bodies connect the connecting body fixing portions disposed on the first flat plate portion to the first plate, and
  the second connecting bodies connect the connecting body fixing portions disposed on the second flat plate portion and the second plate.

6. The actuator according to claim 2, wherein at least one of the first inner member and the second inner member comprises two raised portions extending from edges of both sides of the magnet fixing portion in the second direction to a side on which the coil is disposed.

7. The actuator according to claim 1, wherein one of the two first connecting plate portions and the two second connecting plate portions are press-fitted to an inner side of the other one of the two first connecting plate portions and the two second connecting plate portions.

* * * * *